US007657691B2

(12) United States Patent
Luke

(10) Patent No.: US 7,657,691 B2
(45) Date of Patent: Feb. 2, 2010

(54) SIMPLIFIED UNIVERSAL SERIAL BUS (USB) HUB ARCHITECTURE

(75) Inventor: David Luke, Boise, ID (US)

(73) Assignee: Cypress Semiconductor Corporation, San Jose, CA (US)

(*) Notice: Subject to any disclaimer, the term of this patent is extended or adjusted under 35 U.S.C. 154(b) by 111 days.

(21) Appl. No.: 11/240,908

(22) Filed: Sep. 30, 2005

(65) Prior Publication Data
US 2007/0079045 A1 Apr. 5, 2007

(51) Int. Cl.
*G06F 13/20* (2006.01)
*H04L 12/54* (2006.01)
(52) U.S. Cl. .................. 710/313; 370/412; 370/429
(58) Field of Classification Search ............. 710/313; 370/412–418, 429
See application file for complete search history.

(56) References Cited

U.S. PATENT DOCUMENTS 6,125,420 A * 9/2000 Eidson ................... 710/242
6,212,165 B1 * 4/2001 Mann et al. ............. 370/231
6,970,419 B1 * 11/2005 Kalkunte et al. ......... 370/230
2003/0185249 A1 * 10/2003 Davies et al. ............ 370/535
2006/0036558 A1 * 2/2006 Mathews ................. 705/414

OTHER PUBLICATIONS

Compaq, et al., Universal Serial Bus Specification, Revision 2.0, Apr. 27, 2000, pp. 324-331.
International Search Report for International U.S. Appl. No. PCT/US06/33412 mailed Sep. 14, 2007, 1 page.
Written Opinion of the International Searching Authority for International U.S. Appl. No. PCT/US06/33412 mailed Sep. 14, 2007; 4 pages.

* cited by examiner

*Primary Examiner*—Mark Rinehart
*Assistant Examiner*—Jeremy S Cerullo

(57) ABSTRACT

A Universal Serial Bus (USB) device uses a same elasticity buffer for buffering packets for multiple different ports and only necessary packet detection circuitry is associated with the individual ports. A collision detection circuit is further included corresponding with information received from the packet detection circuitry. This simplified universal elasticity buffer architecture reduces the complexity and cost of the USB device.

25 Claims, 6 Drawing Sheets

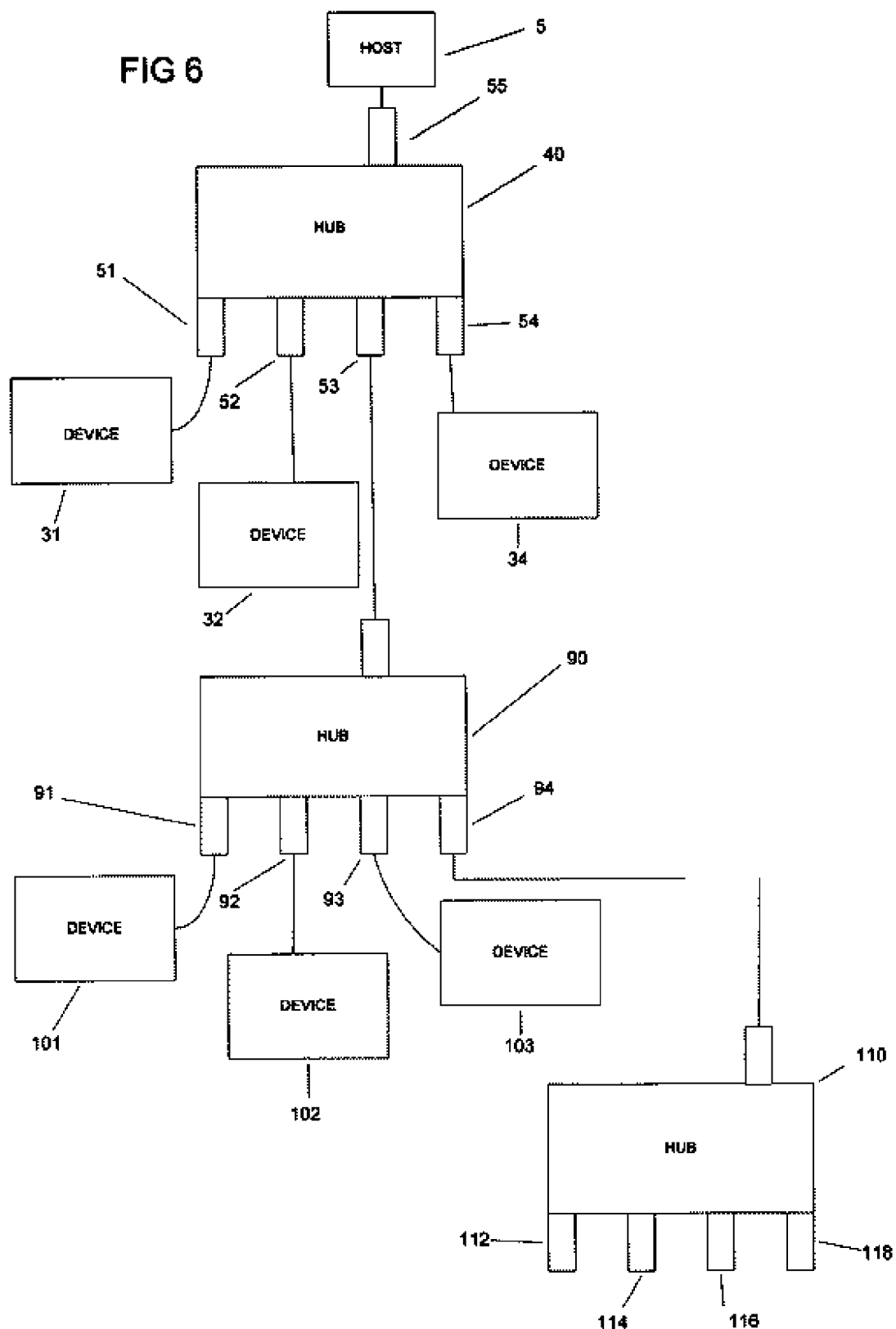

SIMPLIFIED UNIVERSAL SERIAL BUS (USB) HUB ARCHITECTURE

BACKGROUND OF THE INVENTION

The invention relates to a simplified Universal Serial Bus (USB) hub architecture.

The USB is a high speed serial interface used to connect a host device, such as a personal computer, to one or more peripheral devices such as printers, modems, digital cameras, etc. Throughout the development of modem computer systems, peripheral devices have had any number of different interface connector types, usually specific to the specifications of the device manufacturer. The USB architecture was designed as a universal interface that works with a wide variety of different devices made by different manufacturers.

A USB hub repeats and controls the flow of data packets between a host and one or more peripheral devices. The USB hub manages the start and end of data packet transfers and manages re-clocking and certain error conditions associated with the USB data traffic.

In the USB architecture, the host can only communicate with one downstream device at a time. The USB hub allows the host to communicate with multiple downstream devices by broadcasting a data packet or command to all of the active downstream ports/devices. The address portion of the data packet specifies the device intended to receive the command, provide the service, or send the reply. The downstream device associated with the USB packet sends a reply data packet back upstream to the host. The upstream data packet is only received by the host and is not broadcast to the other downstream ports.

After broadcasting the downstream packet for a transaction in which the host expects a response from a downstream device, the host does not send any further data until a reply is received back from the targeted downstream device or until a defined response period has lapsed without receiving a reply. The maximum allowable response period is usually defined as the maximum amount maximum allowable response period is usually defined as the maximum amount of time that an electronic signal requires to propagate back and forth from the host to the most remote downstream device.

If the response period lapses, the host may either resend the data packet or assume the downstream device is not functioning correctly and cease transmission to that downstream device. In either case, in a proper functioning USB system, there is only one active downstream data packet sent from the host or one active upstream data packet sent from one of the downstream device being transmitted at any given time.

Thus, in a properly functioning USB system, only one downstream device should ever be transmitting upstream data traffic at any given time. However, during a malfunction, two downstream devices might send overlapping upstream data packets. For example, the transmission of a second upstream data packet may commence before a first upstream data packet finished transmission. This is not supposed to occur in a properly functioning USB system; however, a faulty downstream device may send false data, or an incorrectly wired USB system may cause a delay in the downstream device response time. The industry standard Universal Serial Bus Specification Revision 2.0 (USB 2.0) requires the USB hub to detect these error conditions.

The USB 2.0 specification allows the USB hub to operate in two different ways when a collision is detected. The USB hub can "garble" upstream messages so that the host is informed there is a problem. The USB hub can alternatively block the overlapping packets so that only the first received upstream data packet is passed through to the host.

The USB 2.0 specification recommends designing USB systems that garble the upstream messages during collision conditions. This provides notice to the host and allows the host to determine any appropriate remedial actions that need to take place. This technique is favorable since the blocking technique might mislead the host into accepting a false reply from the malfunctioning device (e.g. as a result of a faulty device or faulty bus). The blocking technique could also result in the host reestablishing connectivity at the conclusion of the first data packet and mid-stream through the second data packet. The blocking technique also allows data packets to be lost or dropped without notifying the host.

Existing USB hub repeaters use elasticity buffers for each port. The elasticity buffers include Start Of High speed data Packet (SOHP) logic that identifies when a valid data packet is being transmitted. When two elasticity buffers associated with two different ports each identify a SOHP event is occurring (e.g., upstream packets are being received on two different ports at the same time), the hub responds by sending the garbled message to the host. The elasticity buffers also handle data latency and frequency variation between different clock domains, and also include the SOHP logic that identify the beginning and end of received packets.

As described above, valid data should only arrive at one port at any given time (the active port). Therefore, only one elasticity buffer should be active at any given time. The SOHP logic is the only part of the elasticity buffer used in the non-active ports. The extra circuitry used for the underutilized elasticity buffers increases the complexity and cost of the USB hub.

SUMMARY OF THE INVENTION

A Universal Serial Bus (USB) device uses a same elasticity buffer for buffering packets for multiple different ports and only necessary packet detection circuitry is associated with the individual ports. This simplified universal elasticity buffer architecture reduces the complexity and cost of the USB device.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 6 shows how the USB hub shown in FIG. 2 can be used to increase the number of downstream devices coupled to a host.

DETAILED DESCRIPTION

Figure 1:
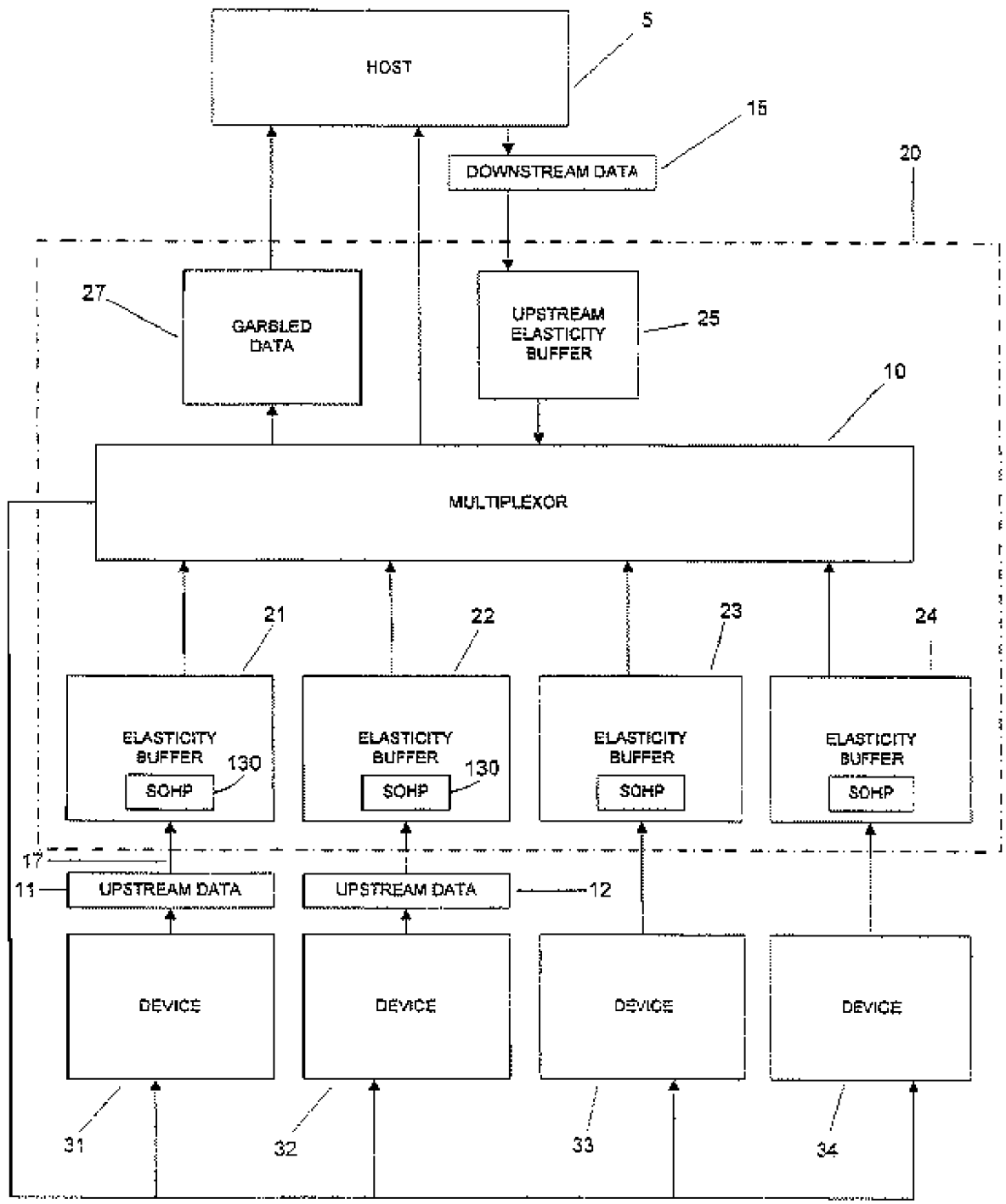
FIG. 1 is a diagram of a conventional USB hub.

A conventional Universal Serial Bus (USB) hub 20 is shown in FIG. 1. A host 5 can be any computer or intelligent device that has the ability to communicate with and control a number of downstream peripheral devices 31-34. The USB hub 20 serves as an interface between the host 5 and the multiple downstream devices 31, 32, 33 and 34. A downstream data packet 15, or command 15, is initially received in an upstream elasticity buffer 25 from the host 5. The upstream elasticity buffer 25 controls data latency and frequency variation between two clock domains, in part by re-clocking the data. Re-clocking involves a retransmission of the data using a local clock, in part to control the level of jitter.

As the upstream elasticity buffer 25 is emptied, the downstream data packet 15 is sent to the multiplexor 10. The multiplexor 10 establishes connectivity with a valid downstream port. The multiplexor 10 includes port selector logic circuit to perform these activities.

The downstream data packet 15 includes the address of the intended downstream device 31-34. For example, downstream packet 15 may have an address associated with downstream device 31. However, the nature of USB broadcasts downstream packet 15 to all downstream devices 31-34 connected to the hub 20. The downstream devices 32-34 not targeted to receive the downstream data packet 15 simply ignore the downstream data 15 and do nothing.

The targeted first downstream device 31 receives the downstream data packet 15 and performs a function, or provides a reply, by sending an upstream data packet 11 back to host 5. The upstream reply data packet 11 sent from the first downstream device 31 is received by an elasticity buffer 21 associated with the downstream port 17 connected to device 31. The elasticity buffer 21 performs in a manner similar to the upstream elasticity buffer 25 including re-clocking the upstream data packet 11.

The multiplexor 10 receives the upstream packet 11 from the elasticity buffer 21 and retransmits the upstream data to the host 5. Provided the USB system is functioning correctly, the host 5 successfully transmits the downstream data packet 15 to the targeted downstream device 31, and the downstream device 31 successfully responds by sending the upstream data packet 11 back to host 5.

Malfunctions

In some cases, it is possible that the targeted downstream device 31-34 is not able to respond, or perhaps data packets are lost en route to either the host 5 or to the downstream device. In this case, the host 5 will timeout after a predefined period of time in order to take a responsive action including resending the data packet, selecting a different downstream device, and/or generating an error message that indicates a possible device or system malfunction.

In another malfunction situation, a downstream device may incorrectly respond to a downstream data packet or command sent by the host 5. For example, the host 5 may send a downstream data packet 15 targeted for downstream device 31. As described above, the hub 20 broadcasts the downstream data packet 15 to all of the downstream devices 31, 32, 33 and 34.

Although only the first downstream device 31 is targeted by an associated address in the data packet 15, in some instances, a faulty second downstream device 32 can also, or alternatively, send an upstream data packet 12 back to the host 5. Either the first upstream data packet 11 or the second upstream data packet 12 can arrive at the host 5 ahead of the other. If the first data packet 11 arrives ahead of the second data packet 12, then the correct device replied to the command. However, if the second data packet 12 arrives ahead of the first data packet 11, the host 5 receives a reply from the wrong downstream device.

As described above, the USB 2.0 specification describes two different methods of handling this situation. In the first scheme, the hub 20 garbles any data 27 sent back to the host 5 when the two upstream data packets 11 and 12 collide in response to the same downstream data packet 15. The garbled data 27 serves as notice to the host 5 there is some problem with one or more downstream devices 31-34, or with the USB system in general. The host 5 will then take some responsive action.

In the second scheme, the hub 20 transmits the first upstream data packet received in one of the elasticity buffers 21-24, and then blocks any later received colliding upstream data from other elasticity buffers. However, there is no guarantee that the correct upstream data packet 11 arrives before the incorrect data packet 12. Thus, the host 5 could receive the incorrect upstream data packet 12.

It is possible that after completing transmission of the correct upstream data packet 11, that the previously blocked incorrect upstream data packet 12 would then start being transmitted to the host 5. This could create a new connectivity session between the faulty downstream device 32 and the host 5. As such, the USB 2.0 specification recommends the first technique that garbles upstream signaling to the host when multiple upstream responses are identified in response to the same downstream data packet.

The errors discussed above, including multiple data packets being sent in response to the same downstream command, is referred to generally as data collision. The elasticity buffers 21-24 each include an associated SOHP detector 13 that monitors the upstream data traffic and detect packet collisions.

While the system described above adequately detects collision conditions, using elasticity buffers 21-24 for each downstream port considerably increases complexity in the hub 20, as measured in flip-flops. The additional circuitry adds to hub complexity and expense. This is inefficient since only one elasticity buffer is actually buffering data at any given time while the other elasticity buffers are merely monitoring for SOHP events.

Multi-port Elasticity Buffer

Figure 2:
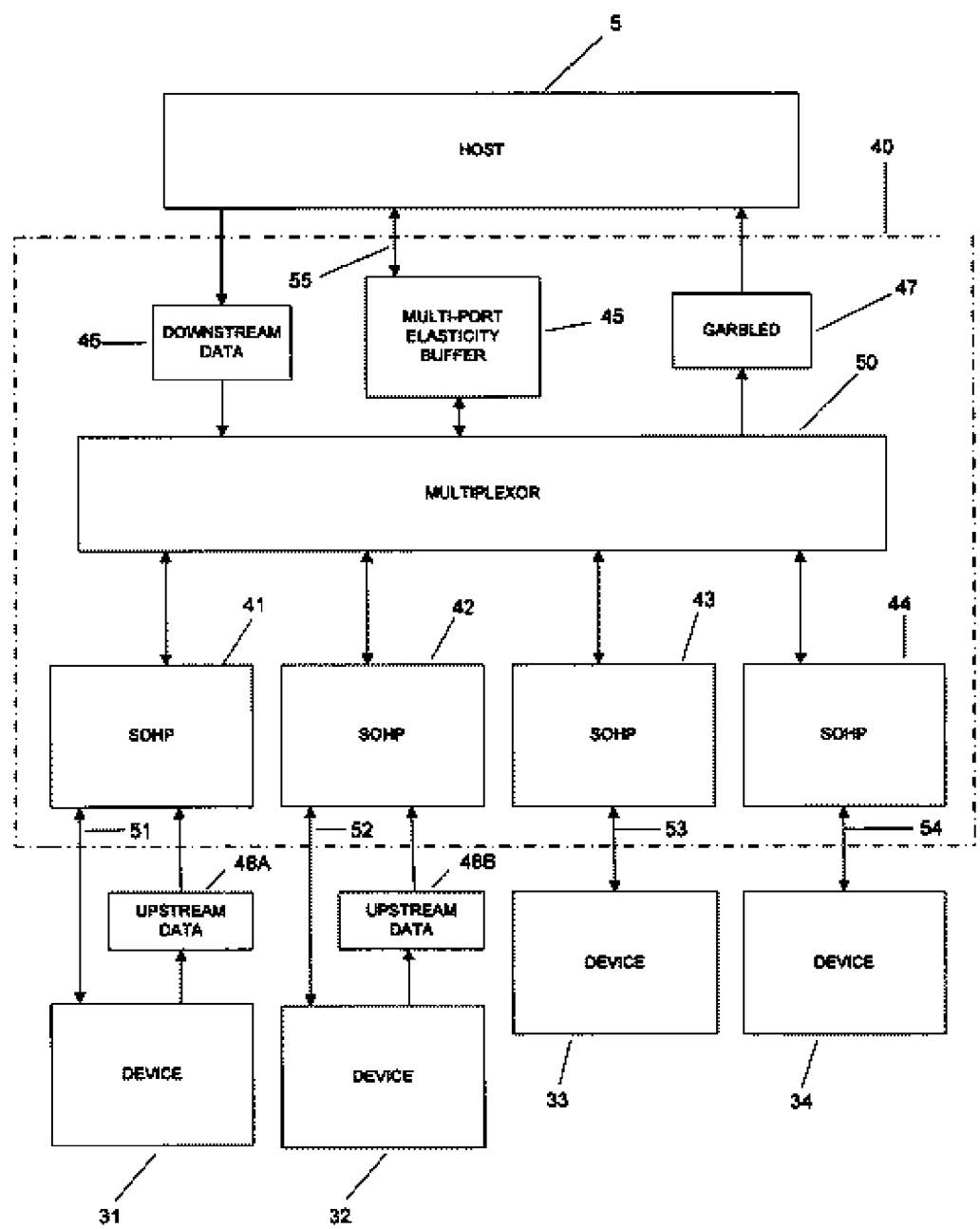
FIG. 2 is a diagram of a USB hub that uses a universal elasticity buffer.

Referring to FIG. 2, a hub 40 includes multiplexing circuitry 50 that transmits data between upstream port 55 and multiple downstream ports 51-54. The upstream port 55 connects to the host 5 and the one or more downstream ports 51, 52, 53 and 54 connect to one or more downstream devices 31, 32, 33 and 34, respectively.

The USB hub 40 uses a universal—multi-port elasticity buffer 45 to buffer USB data for multiple different ports. Because only one data packet needs to be buffered at any given time, both downstream data packets 46 received from host 5 and upstream packets 48 received from the downstream devices 31, 32, 33 or 34 are buffered using a common universal elasticity buffer 45. The universal elasticity buffer 45 performs the packet buffering that was previously provided by the multiple separate elasticity buffers 25 and 21-24 in FIG. 1.

The elasticity buffers 21-24 in FIG. 1 are replaced with relatively simple Start Of High speed data Packet (SOHP) circuitry 41-44, respectively. The SOHP circuitry 41-44 detects the Start Of Packet (SOP) and the End Of Packet (EOP) states for packets received from the downstream devices 31-34.

Collisions

As described above, a downstream device 31-34 may malfunction by sending a false reply in response to a command from host 5. For example, the host 5 may send a downstream data packet 46 targeted to downstream device 31. Since the downstream data packet 46 is broadcast by hub 40 to all of the devices 31, 32, 33 and 34, in some situations a faulty second device, such as downstream device 32, could also, or alternatively, send a reply to the host 5.

The SOHPs 41-44 are used to detect when a SOP event for a second upstream data packet is detected before an EOP event is detected for a first received data packet. When the first upstream data packet is not finished transmitting prior to receiving the start of the second upstream data packet, the hub 50 garbles any message 47 sent back to the host 5. This provides an error notification to the host 5 which can then take any necessary responsive action.

It is also possible that an SOHP 41-44 does not send an EOP alert signal after some predefined period of time after the SOP alert is generated. For example, the upstream data packet 48A may contain too much data, or there may be a delay in data packet transmission due to faulty equipment or incorrect system configuration. The hub 40 can also either timeout or send some similar messaging to the host 5 to indicate this error.

The SOHPs 41-44 also include data detection logic that distinguishes an actual SOP event (valid data packet) from noise that may be received on the downstream ports 51-54. A valid data packet may include a certain minimum number of bits and data pattern, such as a four-bit repeating pattern of "jkjk" or "kjkj". This allows the SOHPs 41-44 to ensure valid upstream data packets are being received and then transmitted to the host 5.

Figure 3:
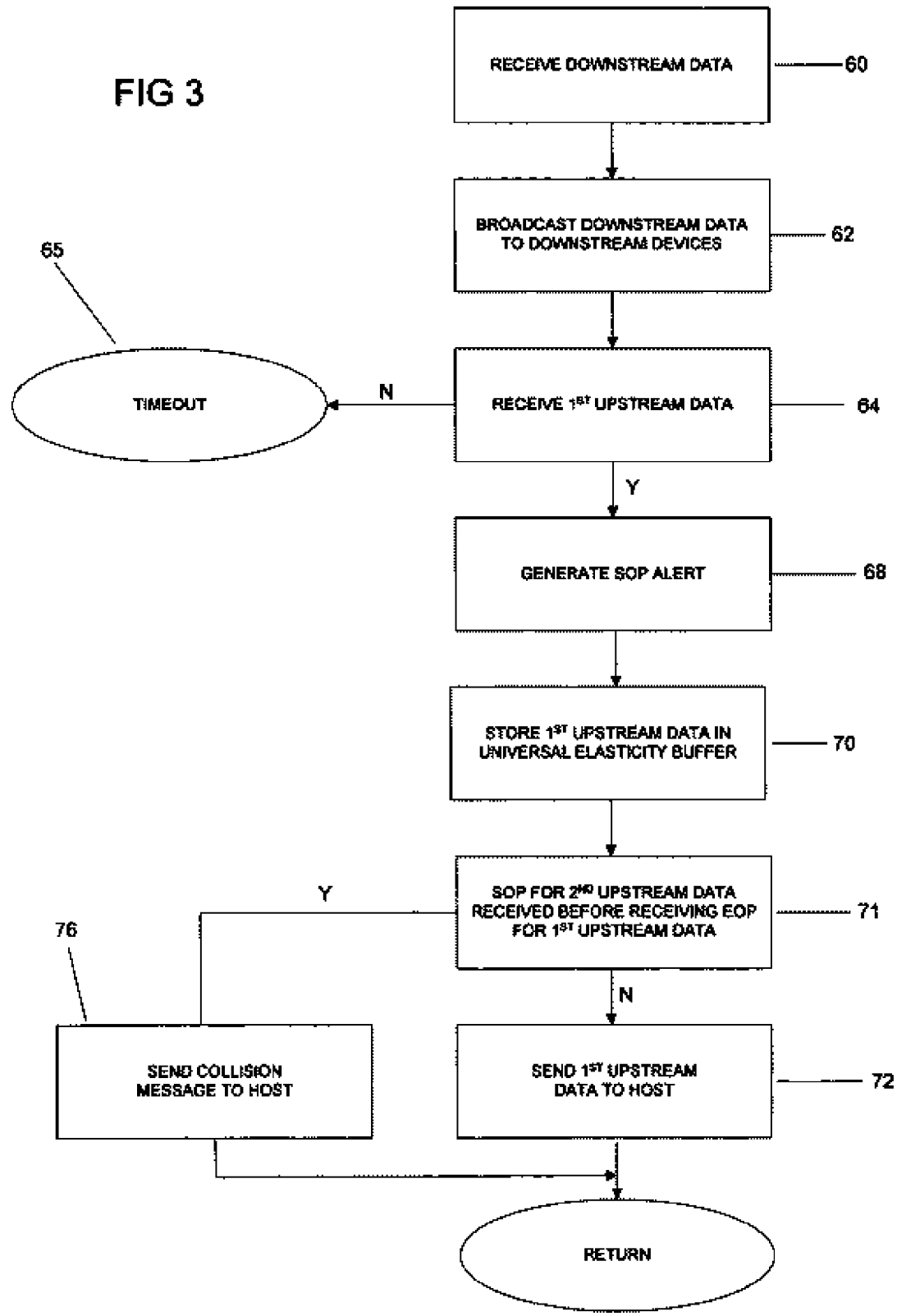
FIG. 3 is a flow diagram showing how the USB hub in FIG. 2 operates.

FIG. 3 describes in more detail operations performed in the hub 40 shown in FIG. 2. The USB hub 40 in operation 60 receives downstream data 46 from the host 5. In operation 62, the hub 40 broadcasts the downstream data 46 to all of the downstream devices 31-34 over downstream ports 51-54, respectively. The downstream device 31, 32, 33, or 34 targeted for the downstream data 46 has an address corresponding with an address in downstream data 46.

In this example, the downstream device 31 is the targeted device for downstream data 46. Downstream device 31 generates upstream data 48A in response to receiving the downstream data 46. The hub 40 receives the first upstream data 48A in operation 64. The SOHP circuitry 41 generates a first SOP alert signal in operation 68 when the first data packet 48A is detected at the downstream port 51. The first upstream data 48A is then stored in the universal elasticity buffer 45 in operation 70.

In a proper functioning system, an EOP signal should be generated by the SOHP 41 indicating the end of upstream data 48A before any other upstream data 48 is received by the hub 40. If an EOP signal is generated by SOHP 41 before receiving another SOP signal, the hub 40 in operation 71 sends the first upstream data 48A to the host 5 in operation 72.

However, as described above, there may be situations where one or more of the USB devices are not operating correctly. For example, downstream device 32 may send another upstream data packet 48B before the end of upstream data packet 48A. For example, the SOHP 42 generates an SOP alert signal in operation 71 before SOHP 41 generates the EOP signal. In this situation, the hub 40 sends a collision message to host 5 in operation 76. For example, the hub 40 sends a garble message 47 to the host 5.

If no devices respond to the broadcast downstream data packet 46, then there will be no SOP event or SOP detection and alert. The hub and/or host 5 may eventually time out in operation 65 according to a predefined period of time. In this case, the host 5 may take a responsive action such as resending the downstream data packet 46, send the data to a different device, and/or generate an error report among other possible responses.

The universal elasticity buffer 45, SOHPs 41-44, and multiplexer 50 may all be implemented in the same Integrated Circuitry (IC) or processor, or may be implemented in separate circuits. One embodiment of the hub 40 uses only one universal elasticity buffer 45 to handle all upstream and downstream data traffic. However, it is also possible that one elasticity buffer may be used for some or all of the upstream data 48 and another elasticity buffer is used for the downstream data 46. Alternatively, multiple different elasticity buffers may be used for buffering different combinations of downstream ports 51-54.

In one example, replacing the relatively complicated elasticity buffers 21-24 in FIG. 1 with the less complex SOHP circuitry 41-44, respectively, can provide close to a 50% reduction in the amount of required high speed logic. This results in improved ease of design and reduced circuit complexity.

Figure 4:
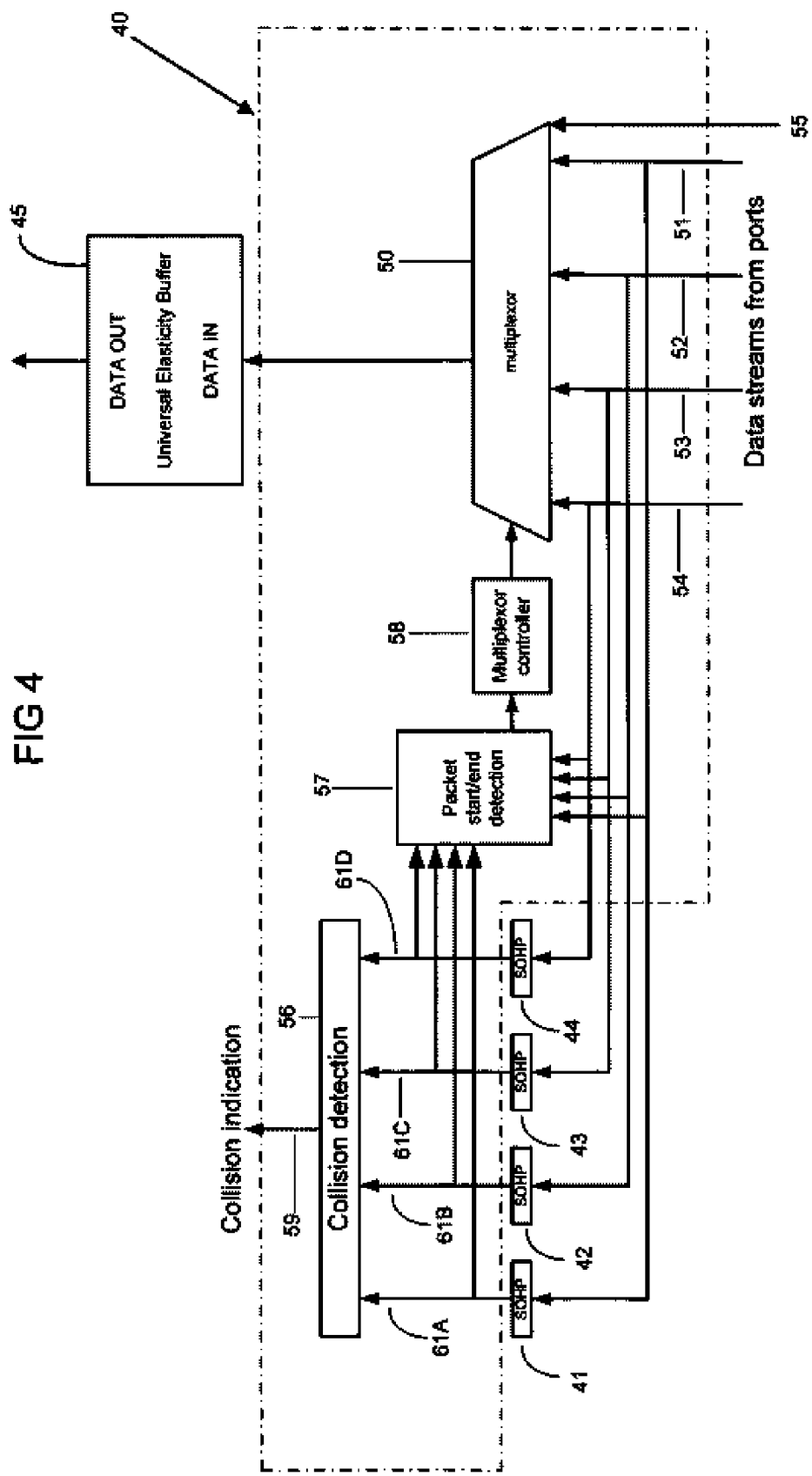
FIG. 4 is a more detailed block diagram of collision detection circuitry used in the USB hub shown in FIG. 2.

FIG. 4 shows the logic used in the hub 50 in more detail. The SOHP circuits 41-44 monitor data traffic received over downstream ports 51-54, respectively. The SOP and EOP signals 61A-61D generated by the SOHP circuits 41-44, respectively, are fed into both a collision detection circuit 56 and a packet start and end detection circuit 57. When the SOP signal 61 generated by one of the SOHPs 41-44 is generated before the EOP is received from another SOHP 41-44 (i.e., upstream packet collision) the collision detection circuit 56 generates a collision indication signal 59. The collision indication signal 59 in one example is the garbled message that is output on the upstream port 55 to the host 5 (FIG. 2).

The packet start/end detection circuit 57 determines when packets are received at the ports 51-55 and uses a multiplexer controller 58 to connect the port 51-54 associated with the detected packet through multiplexer 50 to the universal elasticity buffer 45. This allows data from either the upstream port 55 or from any of the downstream ports 51-54 to be written into the same elasticity buffer 45.

For example, the SOHP 43 activates a SOP signal 61C when an upstream data packet is detected on downstream port 53. The packet detection start/end circuit 57 reads signal 61C and accordingly causes multiplexer controller 58 to connect the downstream port 53 to elasticity buffer 45. Alternatively, if no packets are detected on ports 51-54, the multiplexer controller 58 may be in a default condition that connects upstream port 55 to elasticity buffer 45. If another SOP signal 61D is detected by collision detector 56, before a EOP signal 61C is detected, then the collision indication signal 59 is activated. In this collision condition, the packet start/end detector 57 may cause the multiplexer 50 to disconnect all the downstream ports 51-54 from elasticity buffer 45.

Figure 5:
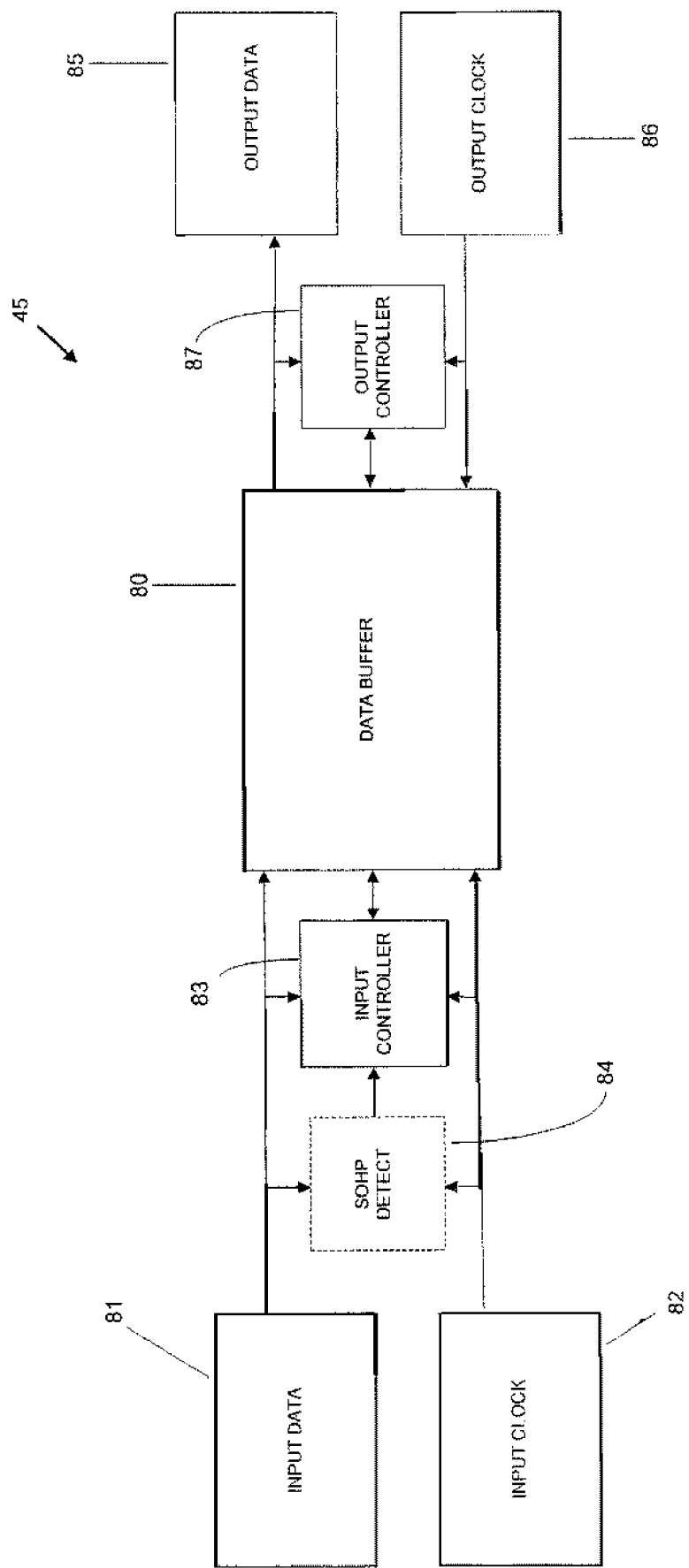
FIG. 5 is a more detailed diagram of the universal elasticity buffer shown in FIG. 2.

FIG. 5 shows a more detailed block diagram of the universal elasticity buffer 45. A data buffer 80 receives input data 81 either from the upstream port 55 or from any of the downstream ports 51-54 in FIG. 2. The data buffer 80 accordingly sends the output data 85 either to the upstream port 55 or to the downstream ports 51-54.

An input controller 83 writes the input data 81 into the data buffer 80 according to an input clock 82 and an output controller 87 reads output data 85 from data buffer 80 according to an output clock 86. When the output clock 86 is faster than the input clock 82, the data buffer 80 can be emptied faster than it is filled. Alternatively, a relatively slower output clock 86 may result in data accumulation in the data buffer 80. The required capacity of the data buffer 80 is determined according to these clock tolerances and maximum size of the buffered data.

It should be noted that a conventional elasticity buffer has an associated SOHP detector 84. However, the SOHP detector 84 is optional in the universal elasticity buffer 45, since the SOHP detection is already being performed by the SOHP circuits 41-44 (FIG. 2) associated with each downstream port 51-54, respectively.

FIG. 6 shows one example configuration of a USB system that uses multiple USB hubs 40, 90, and 110. As described above, upstream port 55 in hub 40 is connected to host 5. Downstream devices 31, 32, and 34 are connected to downstream ports 51, 52, and 54, respectively and hub 90 is connected to downstream port 53. This allows additional downstream devices 101, 102, and 103 to be further placed in communication with the host 5 via ports 91, 92 and 93 in hub 90, respectively.

Similarly one or more additional hubs, such as hub 110, can be connected to downstream port 94 in hub 90. This allows even more downstream devices to be attached to downstream ports 112-118. Each hub 40, 90 and 110 may use the universal elasticity buffer shown above. It should also be noted that hubs using universal elasticity buffers can also work in combination with conventional USB hubs. The hub circuitry 40 may be located in a separate device or may be integrated into the host 5.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A Universal Serial Bus (USB) device comprising:
   multiple downstream ports to receive upstream data from a first device and from a second device; and
   an elasticity buffer to buffer the upstream data from the multiple downstream ports, wherein a collision between first upstream data from the first device and second upstream data from the second device is detected without buffering the second upstream data.

2. The USB device according to claim 1 further comprising packet detection circuits associated with each of the downstream ports that identify upstream data received on the associated downstream ports and use the same elasticity buffer for storing detected packets, wherein at least one of the downstream ports is not associated with any buffer other than the elasticity buffer.

3. The USB device according to claim 2 further comprising a collision detection circuit coupled to the packet detection circuits that identify a packet collision when a Start Of High speed data Packet (SOUP) event is detected by one of the packet detection circuits before an End Of High speed data Packet (EOHP) event is detected by a different one of the packet detection circuits for a previously received upstream packet associated with a different one of the multiple downstream ports.

4. The USB device according to claim 3 wherein the collision detection circuit sends a garbled signal to an upstream port when the packet collision is detected without an upstream packet associated with the SOHP event being buffered in the elasticity buffer.

5. The USB device according to claim 2 further comprising a multiplexer circuit that connects the upstream data from the multiple downstream ports to the same elasticity buffer when the upstream data is detected by the packet detection circuits.

6. The USB device according to claim 5 wherein the packet detection circuits are Start Of High speed data Packet (SOHP) circuits that share the same elasticity buffer.

7. The USB device according to claim 2 further comprising an upstream port to receive downstream data, wherein the upstream port is not associated with any buffer other than the elasticity buffer.

8. The USB device according to claim 1 wherein an upstream port, the downstream ports and the elasticity buffer form a USB hub comprising a single elasticity buffer.

9. The USB device according to claim 1 further comprising:
   a multiplexer to multiplex the upstream data, wherein the upstream data for at least one of the multiple downstream ports is not buffered prior to being multiplexed by the multiplexer.

10. The USB device according to claim 1 wherein the first upstream data from the first device is buffered by the elasticity buffer.

11. A method for operating a Universal Serial Bus (USB) hub, comprising:
    receiving a first data packet over a first port;
    buffering the first data packet in an elasticity buffer;
    receiving a second data packet over a second port; and
    detecting a start of high speed data packet of the second data packet to identify a data collision without buffering the second data packet in the elasticity buffer, wherein the elasticity buffer is the only buffer provided in the USB hub.

12. The method according to claim 11 further comprising:
    receiving downstream data from an upstream port;
    broadcasting the downstream data to multiple downstream ports;
    detecting upstream data on the multiple downstream ports in response to the broadcast downstream data; and
    selectively connecting one of the multiple downstream ports to the elasticity buffer.

13. The method according to claim 12 further comprising:
    identifying a collision condition when the upstream data is received from the multiple downstream ports at the same time; and
    sending a collision indication to the upstream port in response to the collision condition.

14. The method according to claim 12 further comprising:
    detecting an End Of Packet (EOP) event from a first data detector associated with the first port, wherein the SOHP event is detected from a second data detector associated with the second port; and
    identifying the data collision when the SOHP event is detected before the EOP event is detected.

15. A method for operating a Universal Serial Bus (USB) hub, comprising:
buffering data from one or more downstream ports in a same elasticity buffer;
receiving upstream data from a first port of the one or more downstream ports;
receiving upstream data from a second port of the one or more downstream ports; and
detecting a data collision of the upstream data received from the first and second ports, wherein the upstream data from the second port is not buffered prior to detecting the data collision.

16. The method according to claim 15 further comprising selectively connecting one of the one or more downstream ports that has detected data to the same elasticity buffer.

17. The method according to claim 16 wherein only one of the one or more downstream ports is connected to the same elasticity buffer at a time.

18. The method for operating a Universal Serial Bus (USB) hub according to claim 15 further comprising:
receiving downstream data from an upstream port; and
buffering both the downstream data from the upstream port and the upstream data from the first port in the same elasticity buffer.

19. The method for operating a Universal Serial Bus (USB) hub according to claim 18 wherein the upstream port is not associated with any buffer other than the same elasticity buffer.

20. A Universal Serial Bus (USB) system comprising:
a USB host device;
multiple USB peripheral devices;
a USB hub connecting the USB host to the multiple USB peripheral devices;
a universal buffer to buffer downstream USB data broadcast from the USB host to the multiple USB peripheral devices, wherein the downstream USB data includes a USB peripheral device address; and
a multiplexer connecting the universal buffer to the downstream USB ports to selectively direct upstream USB data packets transferred from the multiple USB peripheral devices to the USB host according to which upstream USB data packets are received in response to the downstream data, wherein the universal buffer buffers all the downstream USB data and only buffers the selected upstream USB data packets.

21. The USB system according to claim 20 further comprising individual Start Of High speed data Packet (SOHP) circuits associated with different ports in the USB hub for detecting the upstream USB data packets, wherein the individual SOHP circuits operate independently of any individual elasticity buffers, other than the universal buffer.

22. The USB system according to claim 21 further comprising a multiplexer circuit selectively connecting the upstream USB data packets to the universal buffer according to packet detection events identified by the individual SOHP circuits.

23. The USB system according to claim 21 wherein the USB hub sends a collision indication to the USB host device when the individual SOHP circuits identify two or more USB ports receiving colliding upstream USB data packets.

24. The USB system according to claim 21 wherein the universal buffer only buffers upstream USB data from one of the multiple USB peripheral devices at a time.

25. The USB system according to claim 20 further comprising a second USB hub coupled to a downstream port of the USB hub, wherein the second USB hub comprises a second universal buffer, and wherein the second universal buffer is the only buffer provided in the second USB hub.

* * * * *